United States Patent [19]

Pärsson et al.

[11] 4,350,389
[45] Sep. 21, 1982

[54] SAFETY HEADREST FOR A VEHICLE SEAT

[75] Inventors: Nils O. Pärsson, Trollhättan; Sten E. Nilsson, Sjuntorp, both of Sweden

[73] Assignee: Saab-Scania Aktiebolag, Sodertalje, Sweden

[21] Appl. No.: 156,345

[22] Filed: Jun. 4, 1980

[30] Foreign Application Priority Data

Jun. 8, 1979 [SE] Sweden .............................. 7905029

[51] Int. Cl.³ .............................................. A47C 1/10
[52] U.S. Cl. ...................................... 297/410; 297/61; 297/391; 297/396
[58] Field of Search ................. 297/410, 396, 61, 391; 297/399, 400, 401, 402, 397, 396

[56] References Cited

U.S. PATENT DOCUMENTS

| 2,158,183 | 5/1939 | Hascham | 297/410 |
|---|---|---|---|
| 2,952,303 | 9/1960 | Spound et al. | 297/61 |
| 2,985,229 | 5/1961 | Shamblin | . |
| 3,017,780 | 1/1962 | Kienhofer | 297/410 X |
| 3,528,703 | 9/1970 | Ohta | 297/410 X |
| 3,537,750 | 11/1970 | Lohr | 297/410 |
| 3,635,527 | 1/1972 | Weber | 297/410 |
| 3,738,706 | 6/1973 | Caldemeyer | 297/410 |
| 4,082,354 | 4/1978 | Renner et al. | 297/410 |
| 4,222,608 | 9/1980 | Maeda | 297/410 |

FOREIGN PATENT DOCUMENTS

| 1947173 | 4/1971 | Fed. Rep. of Germany | . |
|---|---|---|---|
| 1953141 | 4/1971 | Fed. Rep. of Germany | 297/397 |
| 2630281 | 1/1978 | Fed. Rep. of Germany | . |
| 1427740 | 1/1966 | France | 297/399 |
| 366504 | 4/1974 | Sweden | . |
| 385441 | 12/1932 | United Kingdom | . |
| 734250 | 7/1955 | United Kingdom | 297/399 |
| 893519 | 4/1962 | United Kingdom | . |
| 1084948 | 9/1967 | United Kingdom | . |
| 1240955 | 7/1971 | United Kingdom | . |
| 1245544 | 9/1971 | United Kingdom | . |

Primary Examiner—James T. McCall
Attorney, Agent, or Firm—Cushman, Darby & Cushman

[57] ABSTRACT

A safety headrest is via a holding means connected to the back support of a vehicle seat. The holding means allows the headrest to be adjusted in height relative to the seat. From a web portion on the headrest a forward and a rear leg portion extend downwards so as to embrace the top of the back support to the front and to the rear. In the lowermost position for the headrest said web portion rides on top of the back support. A frame structure of the headrest is connected to a bar slidable in the back support. In an embodiment said bar is adapted for travel under the action of a remote-controlled adjusting mechanism.

11 Claims, 5 Drawing Figures

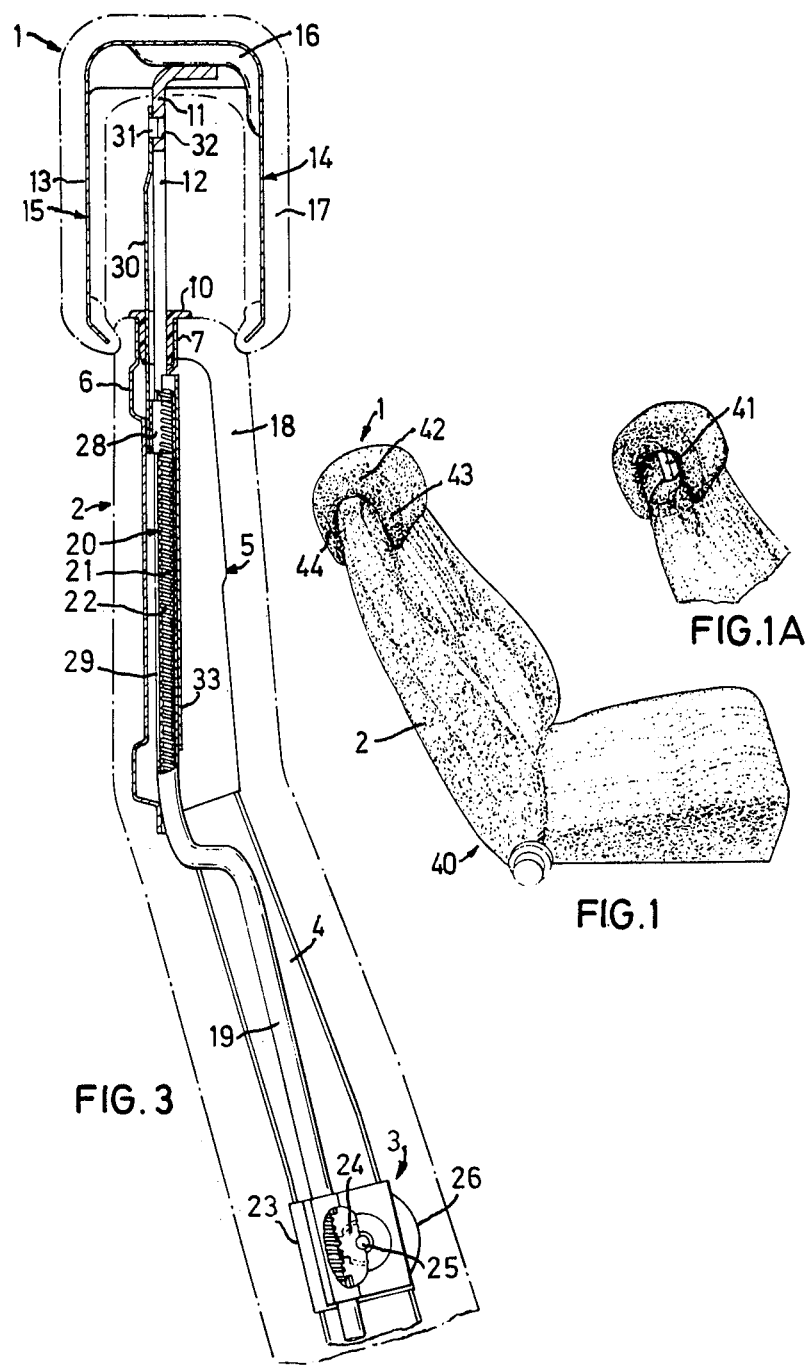

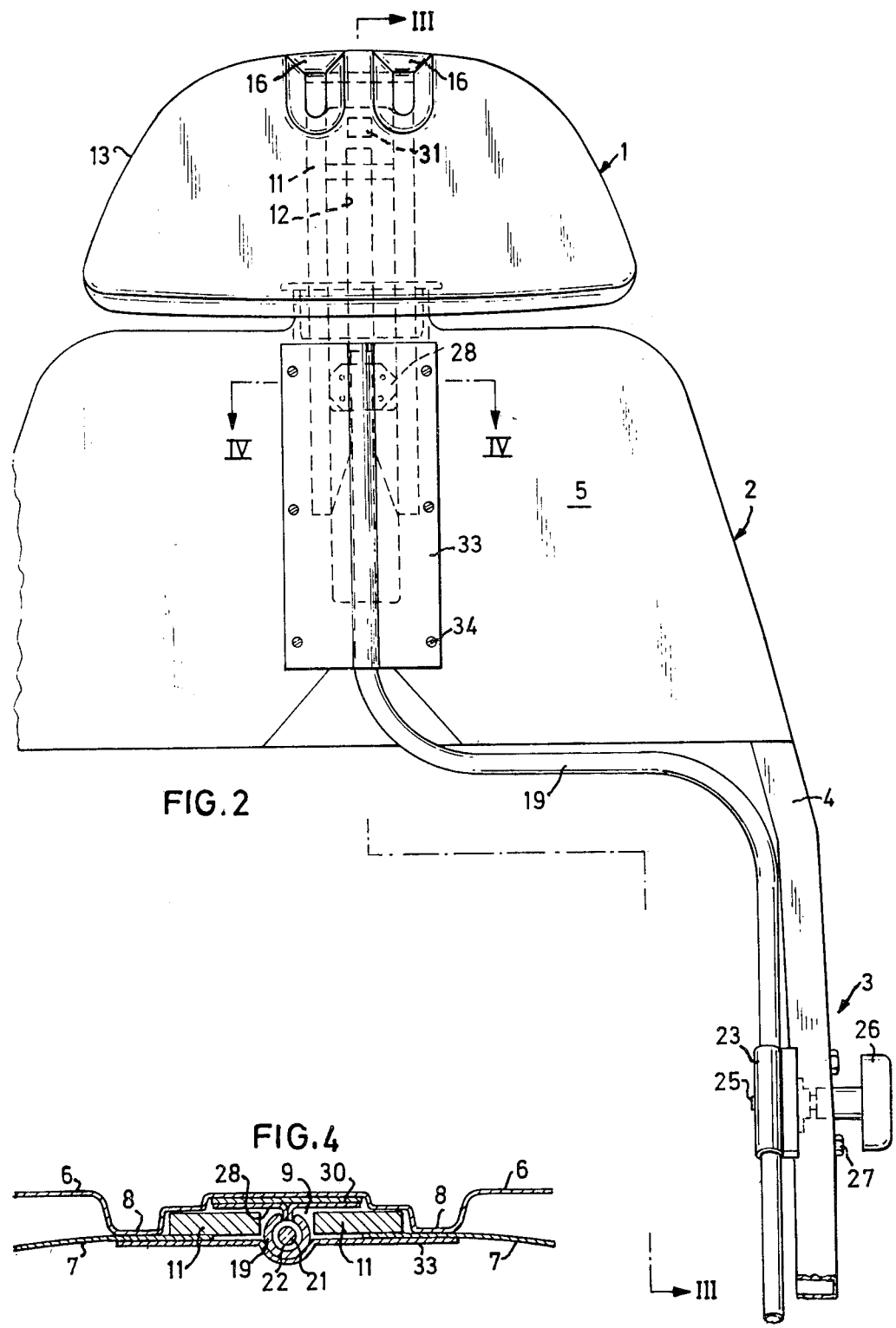

SAFETY HEADREST FOR A VEHICLE SEAT

The present invention relates to a safety headrest for a seat, especially a vehicle seat, said headrest being mounted, via a holding means, on the back support of the seat, said holding means allowing the headrest to be adjusted in height relative to the seat.

Safety headrests on vehicle seats primarily have the object of giving head support to drivers or passengers at extraordinary loads, e.g. loads occurring as a result of rapid changes in vehicle velocity. If a vehicle is involved in a collision from the rear, a person sitting in the vehicle is subjected to a so called whiplash effect, such as to cause the head of the person to be thrown backwards very rapidly relative to the rest of the body. This can result in serious injury, and it is customary to provide at least the front seats in a vehicle with safety headrests limiting said backward movement, with the intention of reducing this danger.

Such a safety headrest is usually arranged on top of the back support of the seat, either as an integrated part thereof or as a separate unit which can be connected to the back support. Mounting a headrest on top of a back support involves certain disadvantages, however. In the first place, the rear view will be obstructed for the driver, and in the second place the forward view will be obstructed for possible back-seat passengers, who can experience this as a kind of confinement. With the object of reducing this problem and with the object of providing the safety headrests with individual adjustment, it is known to arrange the headrests raisable and lowerable in relation to the seat. This kind of safety headrest is thus mounted on one or two vertical bars which are displaceable longitudinally in guides attached to the back support.

Solutions known up to now for mounting headrests adjustably on back supports are still vision-obstructing, and in many cases the height adjustment means are also exposed, which can cause injury to the back-seat passengers with rapid vehicle deceleration. In a frontal collision, it namely often occurs that persons not wearing safety belts and sitting on the back seat of the vehicle are thrown forward towards the front part of the vehicle and are injured by unsuitably formed vehicle seats or the like. With the intention of improving vision and avoiding the drawbacks which safety headrests can cause, it is known to dispose headrests such that they nestle into the upper portion of the back support. Such structures do not appear justified, however, since they allow the supporting function of the headrest to be put out of operation. Furthermore, such arrangements become complicated and require costs which are too high for enabling their use on standard vehicles.

Against the above background, the present invention has the object of forming a safety headrest which is adjustable in height and which in combination with a conventional back support of a vehicle seat enables improvement of vision in the vehicle without inhibiting the head-supporting function of the headrest for somebody sitting in the seat.

According to this invention the headrest has a web portion, from which a forward leg portion and a rear leg portion extend downwards, said leg portions embracing the upper portion and adjoining the front and the rear, respectively, of the back support, said headrest being lowerable to a position where the web portion comes into contact with the uppermost part of the back support.

In this way the safety headrest provides a shock-absorbing shield also for loads from behind, and in addition allround vision in the vehicle is improved.

Other objects and advantages of the present invention will become apparent from the following description taken in conjunction with the accompanying drawings, in which:

FIG. 1 and 1A are perspective view of a seat provided with a safety headrest according to the invention, showing the headrest in different positions, FIG. 2 is a partial front view of the frame structures of a back support and a safety headrest.

FIG. 3 is a sectional view taken on the line III—III of FIG. 2, and

FIG. 4 is a sectional view to an enlarged scale, taken on the line IV—IV of FIG. 2.

As seen in FIG. 1 a safety headrest 1 according to the invention is mounted on the back support 2 of a vehicle seat 40. Said headrest 1 can be used in a lowered position, as shown in FIG. 1, or in one of several raised positions, as indicated in FIG. 1A. The headrest is mounted on the back support 2 via a holding means 41, which can be of a conventional type or of a kind to be described in more detail later.

The safety headrest 1 has a web portion 42 from which a forward leg portion 43 extends downwards at the front of the back support 2, and from which a rear leg portion 44 extends downwards at the rear of the back support 2. The two leg portions 43 and 44 embrace the back support 2. When the headrest 1 is in its lowermost position, the web portion 42 is in contact with the uppermost part of the back support 2, as can be seen in FIG. 1.

In the embodiment shown in FIGS. 2 and 3 the safety headrest 1 is shown in a raised position and is adjustable in height by means of a remote-controlled adjusting mechanism 3.

The back support 2 is conventionally constructed and comprises two side members 4, of which only one is shown in the figures. The upper ends of the side members 4 are welded to a sheet metal casing 5 comprising a rear and a front base plate 6 and 7 respectively, which are mutually joined by means of welding. The rear base plate 6 is formed with two substantially vertical depressions 8 (FIG. 4) enabling the base plates 6 and 7 to be attached to each other along these depressions 8 to form a vertical channel 9 in the metal casing 5. In the upper portion of the vertical channel 9 there is fitted a guide sleeve 10, made from plastics material, for displaceably mounting a bar 11 rigidly attached to the headrest 1. Said channel 9, guide sleeve 10 and bar 11, are incorporated in the holding means 41.

The inventive safety headrest 1 comprises a frame structure 13 of sheet material. As seen in FIG. 3 said frame structure 13 has a cross-sectional shape essentially like an inverted U. Between a front and rear leg 14 and 15, respectively, there is an upper portion or web which is provided with two depressions 16, to which an angularly bent upper portion of the bar 11 is attached by means of welding. The bar 11 extends between the legs 14, 15 of the frame structure 13, and, as previously mentioned, passes through the guide 10 on the back support 2. The bar 11 is formed with a longitudinal, central, open slot 12, successively tapering from the downward end of the bar 11 and having vertical extension with parallel side edges to approximately three quarters of the length of the bar 11.

The back support 2 as well as the headrest 1 are conventionally provided with soft-upholstered covering 17,18, indicated by dash dotted lines in FIG. 3. As will be seen from FIG. 3, the legs 14, 15 of the frame structure 13, and thus the leg portions 43,44 of the headrest 1, embrace the upper portion of the back support 2. A portion of the upholstery 17 of the headrest is in contact with a portion of the upholstery 18 of the back support 2, at both front and back, even when the headrest 1 is in its uppermost position.

Height adjustment control of the headrest 1 is provided in the vehicle seat exemplified by means of the said adjusting mechanism 3, which comprises a flexible cable 20, one end of which, the upper end, is attached to the headrest 1, while the other end, the lower end, is adapted for coaction with a stationarily disposed cogged means 24 incorporated in the adjusting mechanism 3. The flexible cable 20 is displaceably arranged inside a cable tube 19. The cable 20 comprises a core 21 of steel wires wound about each other, the core being surrounded by a helically wound heavier steel wire 22, the cable 20 thus having an appearance similar to that of a screw.

The lower portion of the cable tube 19 is rigidly connected to a housing 23, in which the cogged means 24 is attached to a shaft 25 rotatably mounted in the housing 23. An operating wheel 26 is also mounted on said shaft 25, whereby the cogged means 24 can be rotated. The housing 23 is by means of screws 27 attached to the lower portion of a side member 4 so that the operating wheel 26 is easily accessible. Inside the housing 23, the cogged means 24 meshes in the wire turns of the cable 20 in the same way as a pinion meshes with a rack.

The upper part of the cable 20 is rigidly attached to a fixing plate 28 running in a lengthwise slot 29 in the cable tube 19. The fixing plate 28 is welded to an operating member 30, the upper part of which is provided with a stop 31 fitting into a recess 32 in the bar 11. The operating member 30 provides spring bias for retaining the stop 31 in the recess 32. This spring bias also results in that the bar 11 is pressed into engagement against the front wall of the guide sleeve 10, thus nullifying possible play between the sleeve 10 and the bar 11. The upper end of the cable tube 19 is intended to fit into the vertical, open slot 12 in the bar 11. In order to facilitate assembly there is in the front base plate 7 an opening covered by a removable plate 33 secured by means of screws 34.

For adjusting the height of the headrest 1, the operating wheel 26 is turned, the cable 20 thus being displaced longitudinally in the cable tube 19 to actuate the operating member 30 and the bar 11 for a corresponding travel. So that the headrest 11 will be maintained at an adjusted height, the cable 20 and the cogged means 24 in the housing are preferably formed to have a self-locking action, known per se.

The described mechanism 3 for adjusting the height of the headrest 1 requires little space, resulting in that it is not necessary to increase the thickness of the back support 2 to accommodate the controlling mechanism therein, in case it is desired to use remote control of the headrest.

The described safety headrest 1 can of course also be used for seats not equipped with a remote-controlled adjusting mechanism. The headrest can thus be given a fixed position or be conventionally mounted on a holding means allowing positioning of the headrest at different heights by direct manual action on the headrest. Such holding means are previously known and need therefore not be described in detail. Positioning of the headrest at various heights could be facilitated by using spring means or the like snapping into notches or the like in the guide sleeve 10 or on the bar 11 and by deleting the equipment shown in FIGS. 2–4 for operating the bar 11. Other modifications, with or without an adjusting mechanism for controlling the height of the headrest, would be possible within the scope of the appended patent claims.

What we claim is:

1. A safety headrest for a seat, especially a vehicle seat, said headrest being mounted, via a holding means, on the back support of the seat, said holding means allowing the headrest to be adjusted in height relative to the seat, characterized in that the headrest comprising a frame structure having in cross-section essentially the shape of an inverted U having a web and a forward leg portion and a rear leg portion, the web being secured to a bar displaceably mounted in a guide in the upper part of the back support, the bar being connected to an adjusting mechanism for remotely controlling the height of the headrest and said leg portions embracing the upper portion of the back support and adjoining the front and the rear, respectively, of the back support, said headrest being lowerable to a position where the web portion comes into contact with the uppermost part of the back support, said adjusting mechanism including a flexible cable displaceably located in a cable tube and a housing, one end of the cable being connected to the bar, the other end of said cable coacting with cogged means rotatably mounted in the housing and manually operable for adjusting the height of the headrest.

2. A headrest as claimed in claim 1, characterized in that at least the end portions of said cable are conventionally provided with a helically wound heavy wire forming a screw-like thread into which the cogged means meshes for displacing the cable upon rotation of said cogged means.

3. A headrest as claimed in claim 2, characterized in that the cogged means comprises a pinion rigidly connected with a wheel rotatably mounted on one side of the seat frame.

4. A safety headrest for a seat, especially a vehicle seat, said headrest being mounted, via a holding means, on the backrest of the seat, said holding means allowing the headrest to be adjusted in height relative to the seat, characterized in that the headrest along its entire width is shaped as a yoked cushion having a generally U-shaped cross-section comprising front and rear leg portions arranged to clasp, in all positions of the headrest, the upper portion of the back support, the yoked cushion having a web joining the leg portions and being arranged to rest, in the lowermost position of the headrest, against the upper edge of the back support, said headrest also including an internal frame structure having a generally U-shaped cross-section formed by two leg portions joined by a web the web being secured to a bar displaceably mounted in a guide in the upper part of the back support.

5. A headrest as claimed in claim 4, characterized in that the bar is mechanically connected to an adjusting mechanism for remotely controlling the height of the headrest.

6. A headrest as claimed in claim 5, characterized in that the adjusting mechanism comprises a flexible cable displaceably located in a cable tube and a housing, one end of the cable being connected to the bar, the other end of said cable coacting with cogged means rotatably mounted in the housing and manually operable for adjusting the height of the headrest.

7. A headrest as claimed in claim 6, characterized in that at least the end portions of said cable are conventionally provided with a helically wound heavy wire forming a screw-like thread into which the cogged means meshes for displacing the cable upon rotation of said cogged means.

8. A headrest as claimed in claim 7, characterized in that the cogged means comprises a pinion rigidly connected with a wheel rotatably mounted on one side of the seat frame.

9. A safety headrest carried on the back support of a vehicle seat by a holding means which allows the headrest to be adjusted vertically relative to the seat, said headrest along its entire width being a yoked cushion having a generally U-shaped cross-section formed by a web portion and front and rear leg portions which embrace the front and rear surfaces of the back support in all vertical positions of the headrest, the web portion being arranged to rest against the upper edge of the back support in the lower most position of the headrest, said headrest also including an internal frame structure having a generally U-shaped cross-section formed by two leg portions joined by a web the web being secured to a bar displacably mounted in a guide in the upper part of the back support.

10. A headrest as in claim 4 wherein the web of the cushion has a thickness in the vertical direction which is substantially less than the vertical dimension of the leg portions.

11. A vertically adjustable safety headrest for a vehicle seat back, said headrest comprising an internal frame having generally the shape of an inverted U having front and rear leg portions arranged to clasp, in all vertical positions of the headrest, the upper portion of the back of the vehicle seat and having a web joining the leg portions, the web being secured to a generally vertical bar which is vertically adjustably mounted in a guide in the upper part of the seat back, said frame being covered exteriorly with cushion means having a shape complementary to the frame, the cushion means having front and rear leg portions and a web portion extending the entire width of the headrest and being arranged so that its lower edge rests, in the lowermost position of the headrest, against the upper edge of the vehicle seat back, the height of the web portion of said cushion means being substantially less than the length of the leg portions of the cushion means.

* * * * *